(12) United States Patent
Lin et al.

(10) Patent No.: US 7,430,238 B2
(45) Date of Patent: Sep. 30, 2008

(54) SHARED PIPELINE ARCHITECTURE FOR MOTION VECTOR PREDICTION AND RESIDUAL DECODING

(75) Inventors: Teng Chiang Lin, San Jose, CA (US); Weimin Zeng, San Jose, CA (US)

(73) Assignee: Micronas USA, Inc., Santa Clara, CA (US)

( * ) Notice: Subject to any disclaimer, the term of this patent is extended or adjusted under 35 U.S.C. 154(b) by 612 days.

(21) Appl. No.: 11/138,849

(22) Filed: May 25, 2005

(65) Prior Publication Data

US 2006/0126740 A1    Jun. 15, 2006

Related U.S. Application Data

(60) Provisional application No. 60/635,114, filed on Dec. 10, 2004.

(51) Int. Cl.
*H04N 7/12* (2006.01)
(52) U.S. Cl. .................................. 375/240.16
(58) Field of Classification Search ............ 375/240.01, 375/240.16, 240.24, 240.26; *H04N 7/12*
See application file for complete search history.

(56) References Cited

U.S. PATENT DOCUMENTS

| | | | |
|---|---|---|---|
| 5,384,912 A | 1/1995 | Ogrinc et al. | |
| 6,075,906 A | 6/2000 | Fenwick et al. | |
| 6,177,922 B1 | 1/2001 | Schiefer et al. | |
| 6,281,873 B1 | 8/2001 | Oakley | |
| 6,347,154 B1 | 2/2002 | Karanovic et al. | |
| 6,618,445 B1 | 9/2003 | Peng et al. | |
| 2001/0046260 A1 | 11/2001 | Molloy | |
| 2003/0007562 A1 | 1/2003 | Kerofsky et al. | |
| 2003/0012276 A1 | 1/2003 | Zhong et al. | |
| 2003/0095711 A1 | 5/2003 | McGuinness et al. | |
| 2003/0138045 A1 | 7/2003 | Murdock et al. | |
| 2003/0156650 A1 | 8/2003 | Campisano et al. | |
| 2003/0198399 A1 | 10/2003 | Atkins | |
| 2004/0085233 A1 | 5/2004 | Linzer et al. | |
| 2004/0240559 A1 | 12/2004 | Prakasam et al. | |
| 2004/0260739 A1 | 12/2004 | Schumann | |
| 2004/0263361 A1 | 12/2004 | Pearson et al. | |
| 2005/0001745 A1 | 1/2005 | Sankaran | |
| 2005/0249291 A1* | 11/2005 | Gordon et al. | ......... 375/240.24 |

OTHER PUBLICATIONS

"BCM7411 Product Brief", Broadcom Corporation [online] [Retrieved on Dec. 8, 2005] Retrieved from the Internet: <URL: http://www.broadcom.com/collateral/pb/7411-PB05-R.pdf>. 2 pages.

(Continued)

*Primary Examiner*—Young Lee
(74) *Attorney, Agent, or Firm*—Mayer Brown LLP

(57) ABSTRACT

A shared pipeline architecture is provided for H.264 motion vector prediction and residual decoding, and intra prediction for CABAC and CALVC entropy in Main Profile and High Profile for standard and high definition applications. All motion vector predictions and residual decoding of I-type, P-type, and B-type pictures are completed through the shared pipeline. The architecture enables better performance and uses less memory than conventional architectures. The architecture can be completely implemented in hardware as a system-on-chip or chip set using, for example, field programmable gate array (FPGA) technology or application specific integrated circuitry (ASIC) or other custom-built logic.

4 Claims, 10 Drawing Sheets

OTHER PUBLICATIONS

Burger, Douglas et al., "Memory Systems", The Computer Science and Engineering Handbook, Ed. Allen B. Tucker, 1997, pp. 447-461, CRC Press, Boca Raton, FL.

"Differential Motion Vectors" [online] [Retrieved on Oct. 14, 2002] Retrieved from the Internet: <URL: http://www.cmlab.csie.ntu.edu.tw/cml/dsp/training/coding/h263/motion.html>. 2 pages.

"ITU-T H.264—Series H: Audiovisual and Multimedia Systems Infrastructure of Audiovisual Services—Coding of Moving Video", International Telecommunication Union, Mar. 2005, pp. xiii-330.

Schafer, Ralf et al., "The Emerging H.264/AVC Standard", EBU Technical Review, Jan. 2003, 12 pages.

Tourapis, Alexis M. et al., "Motion Vector Prediction With Reference Frame Consideration", 8 pages.

Wiegand, Thomas, "Context-Based Adaptive Coding and the Emerging H.26L Video Compression Standard", 27 pages, Heinrich Hertz Institute, Berlin, Germany.

Video DSP, TechnoWorld, Sony Corporation, [online], [retrieved on Sep. 7, 2005]. Retrieved from the Internet <URL: http://www.sony.net/Products/SC-HP/cx_news/vol13/pdf/tw_dsp.pdf>.

Broadcom Announces High Definition TV Decoder Reference Design Platform Featuring H.264 Advanced Video Compression, Broadcom Corporation, [online], [retrieved on Sep. 7, 2005]. Retrieved from the Internet <URL: http://www.broadcom.com/press/release/php?id=660337, pp. 1-4>.

AVC/MPEG High-Definition Decoder, Broadcom Corporation, [online], [retrieved on Sep. 7, 2005]. Retrieved from the Internet <URL: http://www.broadcom.com/products/Cable/HDTV-SDTV-Video,-Graphics-%26-Reciever-Chips/BCM7411, pp. 1-2>.

Dual Channel AVC HD Reference Platform, Broadcom Corporation, [online], [retrieved on Sep. 7, 2005]. Retrieved from the Internet <URL: http://www.broadcom.com/products/Satellite/Satellite-Set-top-Box-Chips/BCM97395>.

Dual High-Definition Digital Video System-on-Chip Solution for Cable, Satellite, and DTV, Broadcom Corporation, [online], [retrieved on Sep. 7, 2005]. Retrieved from the Internet <URL: http://www.broadcom.com/products/Cable/Digital-TV-Solutions/BCM7038, pp. 1-2>.

EM8485, Sigma Designs, [online], [retrieved on Sep. 7, 2005]. Retrieved from the Internet <URL: http://www.sigmadesigns.com/pdf_docs/EM8485brochure.pdf>, pp. 1-2.

EM8470 Series, Sigma Designs, [online], [retrieved on Sep. 7, 2005]. Retrieved from the Internet <URL: http://www.sigmadesigns.com/pdf_docs/em847xbrochure.pdf>, pp. 1-2.

EM 8400, Sigma Designs, [online], [retrieved on Sep. 7, 2005]. Retrieved from the Internet <URL: http://www.sigmadesigns.com/pdf_docs/em8400brochure.pdf>, pp. 1-2.

EM8500, Sigma Designs, [online], [retrieved on Sep. 7, 2005]. Retrieved from the Internet <URL: http://www.sigmadesigns.com/pdf_docs/em8500_brochure.pdf>, pp. 1-2.

EM8610, Sigma Designs, [online], [retrieved on Sep. 7, 2005]. Retrieved from the Internet <URL: http://www.sigmadesigns.com/pdf_docs/em8610_brochure.pdf>, pp. 1-2.

EM8610L, Sigma Designs, [online], [retrieved on Sep. 7, 2005]. Retrieved from the Internet <URL: http://www.sigmadesigns.com/pdf_docs/EM8610LSeries_br.pdf>, pp. 1-2.

H.264 Video Decoder for HDTV, Sci-Worx, [online], [retrieved on Sep. 7, 2005]. Retrieved from the Internet <URL: http://www.sci-worx.com/uploads/media/H264VD.pdf>, pp. 1-2.

H.264 Advanced Video Coding: A whirlwind tour, PixelTools, [online], [retrieved on Sep. 7, 2005]. Retrieved from the Internet <URL: http://www.pixeltools.com/h264_paper.html>, pp. 1-8.

H.264/MPEG-4 Part 10 Advanced Video Coding, Moonlight Technology, [online], [retrieved on Sep. 7, 2005]. Retrieved from the Internet <URL: http://www.moonlight.co.il/technology/h264/>, pp. 1-2.

MPEG-4 AVC/H264 Video Decoder, Conexant Systems, Inc., [online], [retrieved on Sep. 7, 2005]. Retrieved from the Internet <URL: http://www.conexant.com/servlets/DownloadServlet/102551A.pdf?FileId=1870>, pp. 1-2.

Wiegand, Thomas, Sullivan, Gary, Luthra, Ajay, Draft ITU-T Rec. H.264, ISO/IEC 8th Meeting: Geneva, Switzerland, 2002, pp. 1-251.

* cited by examiner

SHARED PIPELINE ARCHITECTURE FOR MOTION VECTOR PREDICTION AND RESIDUAL DECODING

RELATED APPLICATIONS

This application claims the benefit of U.S. Provisional Application No. 60/635,114, filed on Dec. 10, 2004. In addition, this application is related to U.S. Ser. No. 11/137,971, filed May 25, 2005, titled "Digital Signal Processing Structure for Decoding Multiple Video Standards", published as U.S. Patent Application Publication 2006/0126740A1 on Jun. 15, 2006. Each of these applications is herein incorporated in its entirety by reference.

FIELD OF THE INVENTION

The invention relates to video processing, and more particularly, to a shared pipeline architecture for carrying out the decoding process of CABAC and CALVC entropy of H.264 main profile and high profile.

BACKGROUND OF THE INVENTION

The H.264 specification, also known as the Advanced Video Coding (AVC) standard, is a high compression digital video codec standard produced by the Joint Video Team (JVT), and is identical to ISO MPEG-4 part 10. The H.264 standard is herein incorporated by reference in its entirety.

H.264 CODECs can encode video with approximately three times fewer bits than comparable MPEG-2 encoders. This significant increase in coding efficiency (e.g., good video quality at bit rates below 2 Mbps) means that more quality video data can be sent over the available channel bandwidth. In addition, video services can now be offered in environments where they previously were not possible. H.264 CODECs would be particularly useful, for instance, in high definition television (HDTV) applications, bandwidth limited networks (e.g., streaming mobile television), personal video recorder (PVR) and storage applications for home use, and other such video delivery applications (e.g., digital terrestrial TV, cable TV, satellite TV, video over xDSL, DVD, and digital and wireless cinema).

In general, all standard video processing (e.g., MPEG-2 or H.264) encodes video as a series of pictures. For video in the interlaced format, the two fields of a frame can be encoded together as a frame picture, or encoded separately as two field pictures. Note that both types of encoding can be used in a single interlaced sequence. The output of the decoding process for an interlaced sequence is a series of reconstructed fields. For video in the progressive format, all encoded pictures are frame pictures. Here, the output of the decoding process is a series of reconstructed frames.

Encoded pictures are classified into three types: I, P, and B. I-type pictures represent intra coded pictures, and are used as a prediction starting point (e.g., after error recovery or a channel change). Here, all macro blocks are coded without prediction. P-type pictures represent predicted pictures. Here, macro blocks can be coded with forward prediction with reference to previous I-type and P-type pictures, or they can be intra coded (no prediction). B-type pictures represent bi-directionally predicted pictures. Here, macro blocks can be coded with forward prediction (with reference to previous I-type and P-type pictures), or with backward prediction (with reference to next I-type and P-type pictures), or with interpolated prediction (with reference to previous and next I-type and P-type pictures), or intra coded (no prediction).

Note that in P-type and B-type pictures, macro blocks may be skipped and not sent at all. In such cases, the decoder uses the anchor reference pictures for prediction with no error.

The advanced coding techniques of the H.264 specification operate within a similar scheme as used by previous MPEG standards. The higher coding efficiency and video quality are enabled by a number of features, including improved motion estimation and inter prediction, spatial intra prediction and transform, and context-adaptive binary arithmetic coding (CABAC) and context-adaptive variable length coding (CAVLC) algorithms.

As is known, motion estimation is used to support inter picture prediction for eliminating temporal redundancies. Spatial correlation of data is used to provide intra picture prediction (prior to the transform). Residuals are constructed as the difference between predicted images and the source images. Discrete spatial transform and filtering is used to eliminate spatial redundancies in the residuals. H.264 also supports entropy coding of the transformed residual coefficients and of the supporting data such as motion vectors.

Entropy is a measure of the average information content per source output unit, and is typically expressed in bits/pixel. Entropy is maximized when all possible values of the source output unit are equal (e.g., an image of 8-bit pixels with an average information content of 8 bits/pixel). Coding the source output unit with fewer bits, on average, generally results in information loss. Note, however, that the entropy can be reduced so that the image can be coded with fewer than 8 bits/pixel on average without information loss.

The H.264 specification provides two alternative processes of entropy coding—CABAC and CAVLC. CABAC provides a highly efficient encoding scheme when it is known that certain symbols are much more likely than others. Such dominant symbols may be encoded with extremely small bit/symbol ratios. CABAC continually updates frequency statistics of the incoming data, and adaptively adjusts the coding algorithm in real-time. CAVLC uses multiple variable length codeword tables to encode transform coefficients. The codeword best table is selected adaptively based on a priori statistics of already processed data. A single table is used for non-coefficient data.

The H.264 specification provides for seven profiles each targeted to particular applications, including a Baseline Profile, a Main Profile, an Extended Profile, and four High Profiles. The Baseline Profile supports progressive video, uses I and P slices, CAVLC for entropy coding, and is targeted towards real-time encoding and decoding for CE devices. The Main Profile supports both interlaced and progressive video with macro block or picture level field/frame mode selection, and uses I, P, B slices, weighted prediction, as well as both CABAC and CAVLC for entropy coding. The Extended Profile supports both interlaced and progressive video, CAVLC, and uses I, P, B, SP, SI slices.

The High Profile extends functionality of the Main Profile for effective coding. The High Profile uses adaptive 8×8 or 4×4 transform, and enables perceptual quantization matrices. The High 10 Profile is an extension of the High Profile for 10-bit component resolution. The High 4:2:2 Profile supports 4:2:2 chroma format and up to 10-bit component resolution (e.g., for video production and editing). The High 4:4:4 Profile supports 4:4:4 chroma format and up to 12-bit component resolution. It also enables lossless mode of operation and direct coding of the RGB signal (e.g., for professional production and graphics).

Given that the H.264 standard is relatively new, there is currently a limited selection of available H.264 coding architectures. What is needed, therefore, are coding architectures that are H.264 enabled.

SUMMARY OF THE INVENTION

One embodiment of the present invention provides a video decoding system configured with a multi-stage shared pipeline architecture for carrying out the H.264 CABAC and CALVC entropy decoding processes in Main Profile and High Profile. The system includes a first stage for grouping macro block properties into 4×4 sub blocks. A second stage is for performing separation of coefficients and run level pairs. A third stage is for performing run level pair decoding. A fourth stage is for performing 4×4 block zigzag transform, DC/AC coefficient merging, and motion vector prediction. A fifth stage is for performing 8×8 transforms in the High Profile, and is skipped in the Main Profile.

The system may further include a line buffer used for motion vector prediction of inter prediction and intra prediction mode decoding. In one particular embodiment, the fourth stage has four split modes for the motion vector prediction: 16×16, 16×8, 8×16, and 8×8, and each split mode has its own motion vector computation logic, reference picture index computation, and frame field scaling. For the 8×8 split mode, there can further be four sub-split modes: 8×8, 8×4, 4×8, and 4×4. In another particular embodiment, B-type picture decoding has a dual channel read write structure, and logic index ID searching is performed on a block by block basis. In one such case, a block N+1 logic index ID is calculated while motion vector prediction is performed for block N, thereby mitigating searching time.

The first stage may include a residual decoder state machine for carrying out residual decoding of I-type, P-type, and B-type pictures. The first stage may include a PCM raw data state machine for carrying out a PCM raw data mode. The second stage may include a state machine for carrying out separation of coefficients and run level pairs. The third stage may include a state machine for carrying out run level pair decoding. The fourth and fifth stages may include a state machine for carrying out transform, DC/AC coefficient merging, and motion vector prediction.

The system may further include a memory interfaced to the first stage via an N-bit bus, wherein there are a plurality of syntax groups of N-bit data inside each macro block, and the memory provides the first stage with the length for every syntax group. In one such case, the first stage includes a memory control state machine that collects information about macro block properties and groups it into 4×4 sub blocks for all predictions. In another such case, N=24, and the N-bits designate current macro block properties including at least one of: intra prediction, inter prediction, skip mode, raw data mode, macro block ID, slice ID, direct mode, macro block split mode, sub block split mode which can be down to 4×4 for luma and 2×2 for chroma and all corresponding intra prediction flag and motion vector differences on X and Y direction, picture reference index for forward and backward predictions, CABAC bit map and level, and CALVC run level information.

The system may further include a dual channel read memory interfaced to the first stage via an N-bit bus, wherein for frame pictures, channel 1 of the memory is for even macro block row reference reads and channel 2 of the memory is for odd macro block reference read, and for field pictures, channel 1 of the memory is for the top field picture and channel 2 of the memory is for the bottom field picture reference read.

In another such embodiment, the system further includes a dual channel read memory interfaced to the first stage via an N-bit bus, wherein if the current decoding picture is a frame picture and a corresponding reference picture is a field picture, either top field or bottom field, then both channel 1 and channel 2 of the memory have the same reference picture, thereby facilitating B-type picture decoding. If the current decoding picture is a B-type picture, then the reference picture can be read from, for example, a DDR SDRAM for direct mode motion vector prediction. In one specific embodiment, the system includes a dual channel-read memory interfaced to the first stage via a 128-bit bus, and for every macro block there are five data beats of 128 bits that contain macro block properties, logical ID and physical ID of every 8×8 block inside a 16×16 macro block, and motion vectors of every 4×4 block.

The system may further include a dual channel write memory interfaced to the fifth stage via an N-bit bus, wherein if the current decoding picture is a frame picture, then even rows are written out through channel 1 and odd rows are written out through channel 2. If the current decoding picture is a field picture, either top field or bottom field, then the top field is written out through channel 1 and the bottom field is written out through channel 2 of the memory, thereby facilitating B-type picture decoding. In one particular case, if the current decoding picture is a reference picture, then properties for each macro block are saved to a DDR SDRAM and read back when the current decoding picture is a B-type picture.

The system may further include a fractional interpolation block and in-line loop filter (FIB/ILF) memory interfaced to the fifth stage via a 128-bit bus, wherein for every macro block, there are 18 data beats of 128 bits that contain macro block properties and expanded motion vector information of luma and chroma for forward and backward reference. Also, a DSP macro block header/data memory may be interfaced with the fifth stage via the 128-bit bus, wherein for every 16×16 macro block, the DSP macro block header/data memory has 1 data beat of 128 bits for a header that includes information for macro block properties and 48 data beats of 128 bits for coefficients. Also, a dual channel write memory may be interfaced with the fifth stage via the 128-bit bus, wherein write channel 1 of the memory is for writing even row macro blocks of frame pictures and top fields of field pictures, while write channel 2 of the memory is for writing odd row macro blocks of frame pictures and bottom fields of field pictures. In one such configuration, each of the FIB/ILF memory, the DSP macro block header/data memory, and the dual channel write memory are implemented using a dual port SRAM interfaced with the fifth stage via the shared 128-bit bus. The system may further include a macro block quantized DCT coefficient memory that is interfaced to the fifth stage via a 128-bit bus, for storing dequantized DC/AC coefficients. This memory may also be, for example, a dual port SRAM. Note that single port SRAMs could also be used, assuming bandwidth requirements could be satisfied. Single port SRAM saves on chip space and power consumption, but may not be appropriate depending on the bandwidth requirements.

Another embodiment of the present invention provides a video decoding system configured with a multi-stage shared pipeline architecture for carrying out the H.264 CABAC and CALVC entropy decoding processes in Main Profile and High Profile. This particular system includes a first stage including a memory control state machine that collects information about macro block properties and groups it into 4×4 sub blocks for all predictions. A second stage is for performing separation of coefficients and run level pairs. A third stage is for performing run level pair decoding. A fourth stage is for performing 4×4 block zigzag transform, DC/AC coefficient merging, and motion vector prediction. Here, the fourth stage has four split modes for the motion vector prediction: 16×16, 16×8, 8×16, and 8×8, and each split mode has its own motion vector computation logic, reference picture index computation, and frame field scaling. For the 8×8 split mode, there can further be four sub-split modes: 8×8, 8×4, 4×8, and 4×4. A fifth stage is for performing 8×8 transforms in the High Profile, and is skipped in the Main Profile. Dual read channels and dual write channels are provided for direct mode motion vector prediction of B-type pictures.

The system may further include a memory interfaced to the first stage via a 24-bit bus, wherein there are a plurality of syntax groups of 24-bit data inside each macro block, and the memory provides the first stage with the length for every syntax group. A fractional interpolation block and in-line loop filter (FIB/ILF) memory may be interfaced to the fifth stage via a 128-bit bus, wherein for every macro block, there are 18 data beats of 128 bits that contain macro block properties and expanded motion vector information of luma and chroma for forward and backward reference. A DSP macro block header/data memory may be interfaced to the fifth stage via the same 128-bit bus, wherein for every 16×16 macro block, the DSP macro block header/data memory has 1 data beat of 128 bits for a header that includes information for macro block properties and 48 data beats of 128 bits for coefficients. A macro block quantized DCT coefficient memory may be interfaced to the fifth stage via a 128-bit bus, for storing dequantized DC/AC coefficients.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

A pipeline architecture is provided for H.264 motion vector prediction and residual decoding, and intra prediction for CABAC and CALVC entropy in Main Profile and High Profile for standard and high definition applications. All motion vector predictions and residual decoding of I-type, P-type, and B-type pictures are completed through the shared pipeline. The architecture enables better performance and uses less memory than conventional architectures. The architecture can be completely implemented in hardware as a system-on-chip or chip set using, for example, field programmable gate array (FPGA) technology or application specific integrated circuitry (ASIC) or other custom-built logic.

In one particular embodiment, a FIFO (first in, first out) queue architecture in a first stage of the pipeline separates the block syntax group into 4×4 sub-block syntax groups, which are then fed into the next stage of the pipeline. Because operation is 4×4 sub-block based, the data format can be accessed more efficiently (better flow control) and the architecture design more structured (for higher performance), relative to conventional architectures. A line buffer is shared by the Y, U, and V components of the video signal during the inter prediction and intra prediction decoding. Dual channels for read and write simplify architecture for direct mode motion vector prediction of B-type pictures.

Multi-Stage Pipeline Architecture

Figure 1A:
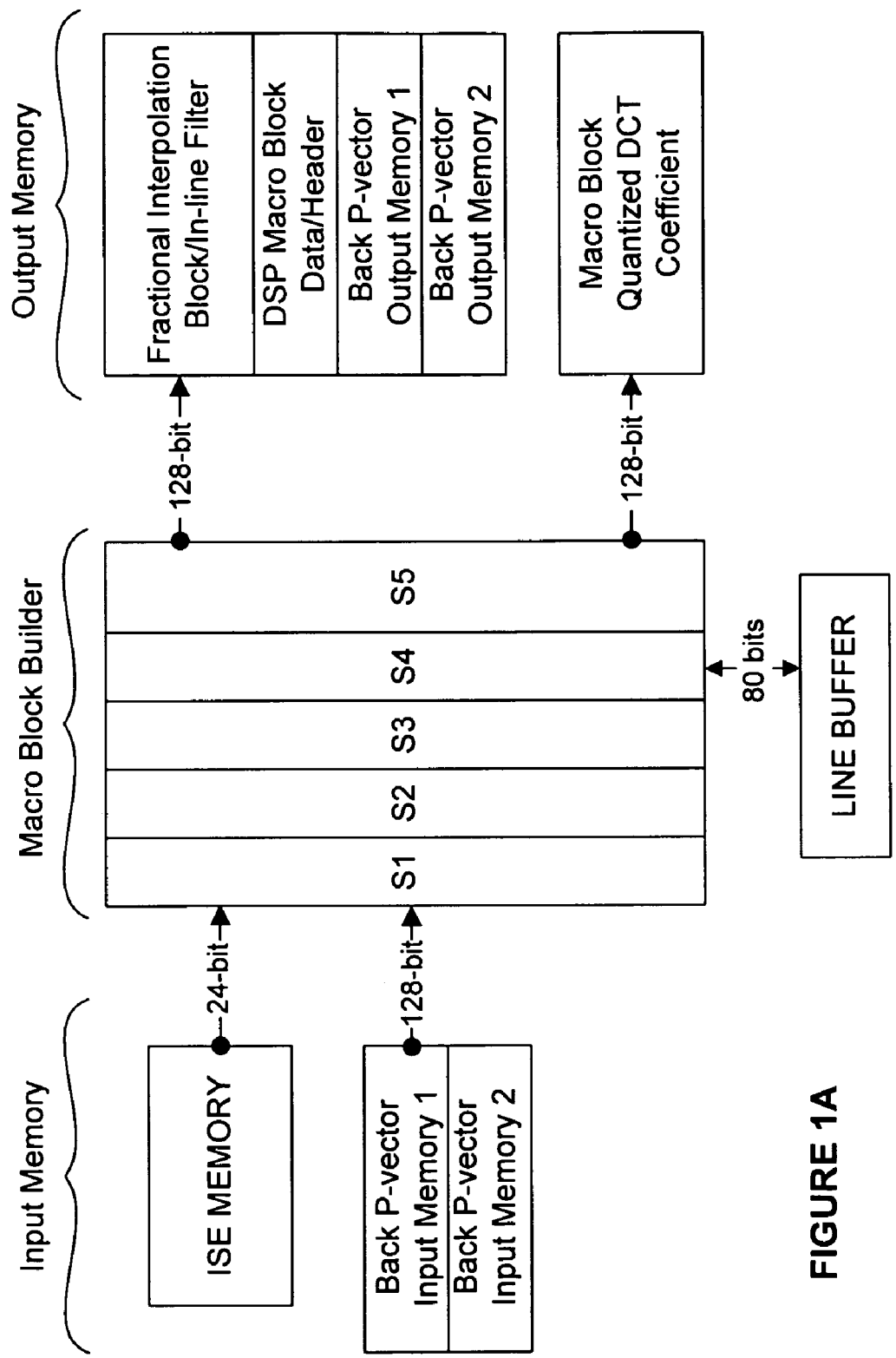
FIG. 1A is a block diagram of a video decoding system configured with a multi-stage pipeline architecture in accordance with one embodiment of the present invention.

FIG. 1A is a block diagram of a video decoding system configured with a multi-stage pipeline architecture in accordance with one embodiment of the present invention. This architecture can be used, for example, for carrying out the H.264 CABAC and CALVC entropy decoding processes in Main Profile and High Profile for standard and high definition applications, and in particular, for carrying out motion vector prediction, residual run level pair decoding, intra prediction, and dual channel read write control for B-type picture decoding.

As can be seen, the system generally includes input memory, a macro block builder, and output memory. The input memory includes an ISE memory, a back P-vector input memory 1, and a back P-vector input memory 2. The macro block builder includes a five stage pipeline (S1 through S5) architecture and a line buffer. The output memory includes an fractional interpolation block and in-line loop filter (FIB/ILF) memory, a digital signal processor (DSP) macro block header/data memory, a back P-vector output memory 1, a back P-vector output memory 2, and a macro block quantized discrete cosine transform (QDCT) coefficient memory.

This architecture can be implemented, for example, as a system-on-chip (e.g., FPGA or ASIC technology, or other custom built integrated circuitry). The on-chip memories can be implemented using single or dual port SRAMs. For instance, the back P-vector input memory 1 and back P-vector input memory 2 can be implemented as one dual port SRAM. The line buffer can be implemented as a single port SRAM. The FIB/ILF memory, DSP macro block header/data memory, back P-vector output memory 1, and back P-vector output memory 2 can each be implemented as one of four sections of another dual port SRAM. Note that other on-chip and off-chip support elements and functionality, such as memory (e.g., DDR SDRAM) and FIB/ILF/DSP modules (for carrying out fractional interpolation, inline filtering, and digital signal processing functions), can also be provided as part of the overall system. A number of hardware implementations will be apparent in light of this disclosure.

As previously stated, there are five stages inside the macro block builder structure. The first stage (S1) mainly handles the interface for the syntax grouping, back P-vector retrieving and PCM raw data mode bypassing through the pipeline. In one embodiment, there is one syntax FIFO and one corresponding length property FIFO for this stage. The state machines associated with this stage are: ISE memory control state machine (FIG. 2A), residual decoder state machine (FIG. 2B), back P-vector read state machine (FIG. 3A), and PCM raw data state machine (FIG. 4). All the results are written into a FIFO between stages S1 and S2.

Figure 5:
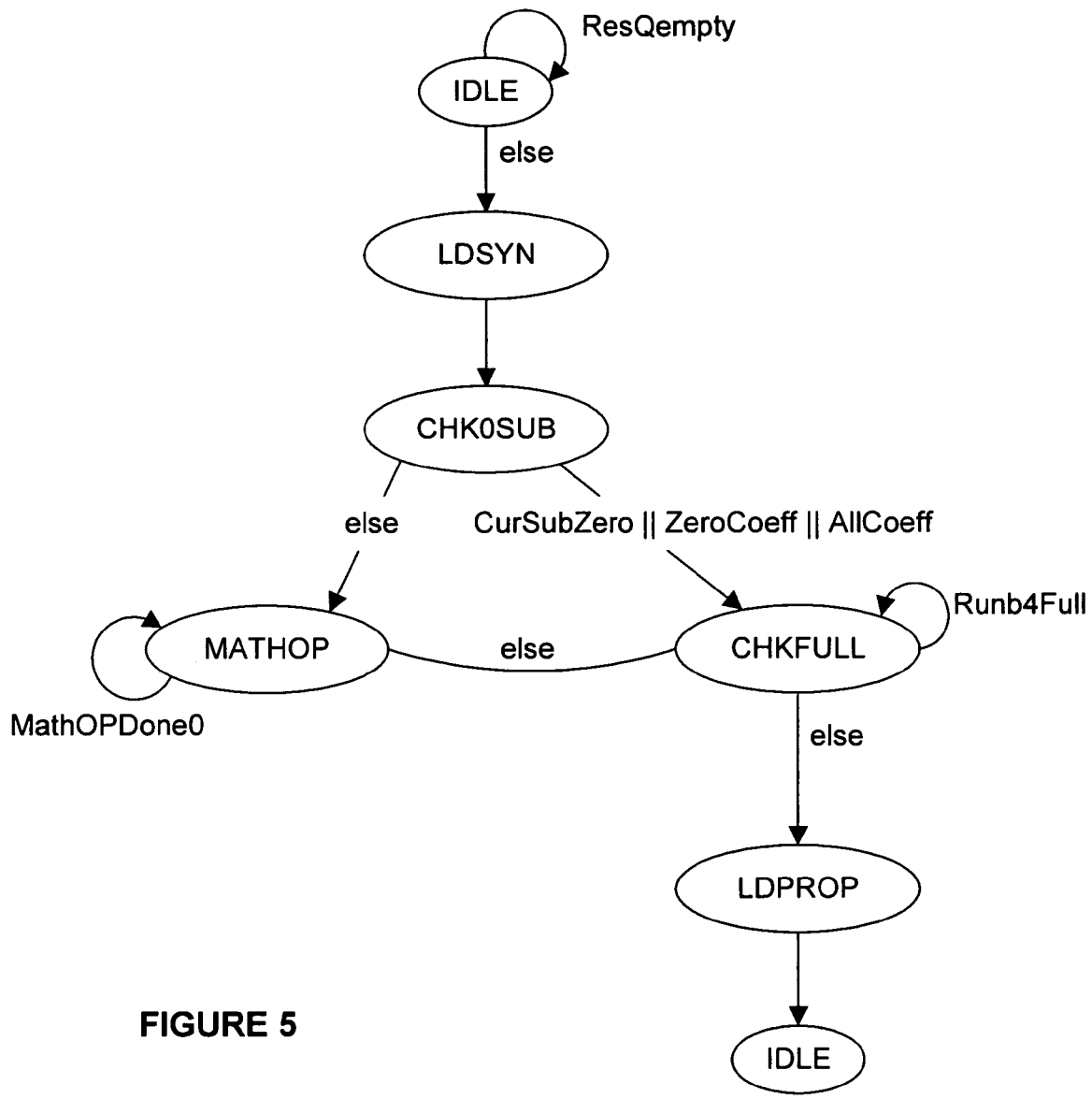
FIG. 5 illustrates a syntax group math state machine configured to carryout separation of coefficients and run level pairs in accordance with one embodiment of the present invention.

The second stage (S2) mainly performs the separation of run and level. Run indicates the number of zeroes between neighboring coefficients, level is the value of the coefficient. This is executed by the separation of coefficient and run level pair state machine (FIG. 5). The results are written into a FIFO between stages S2 and S3.

The third stage (S3) decodes the run level pair. The coefficients are written into the proper position of a coefficient register according to the run information. This is controlled by the run level pair decoding state machine (FIG. 6), and the results are saved into a FIFO between stages S3 and S4.

Figure 7:
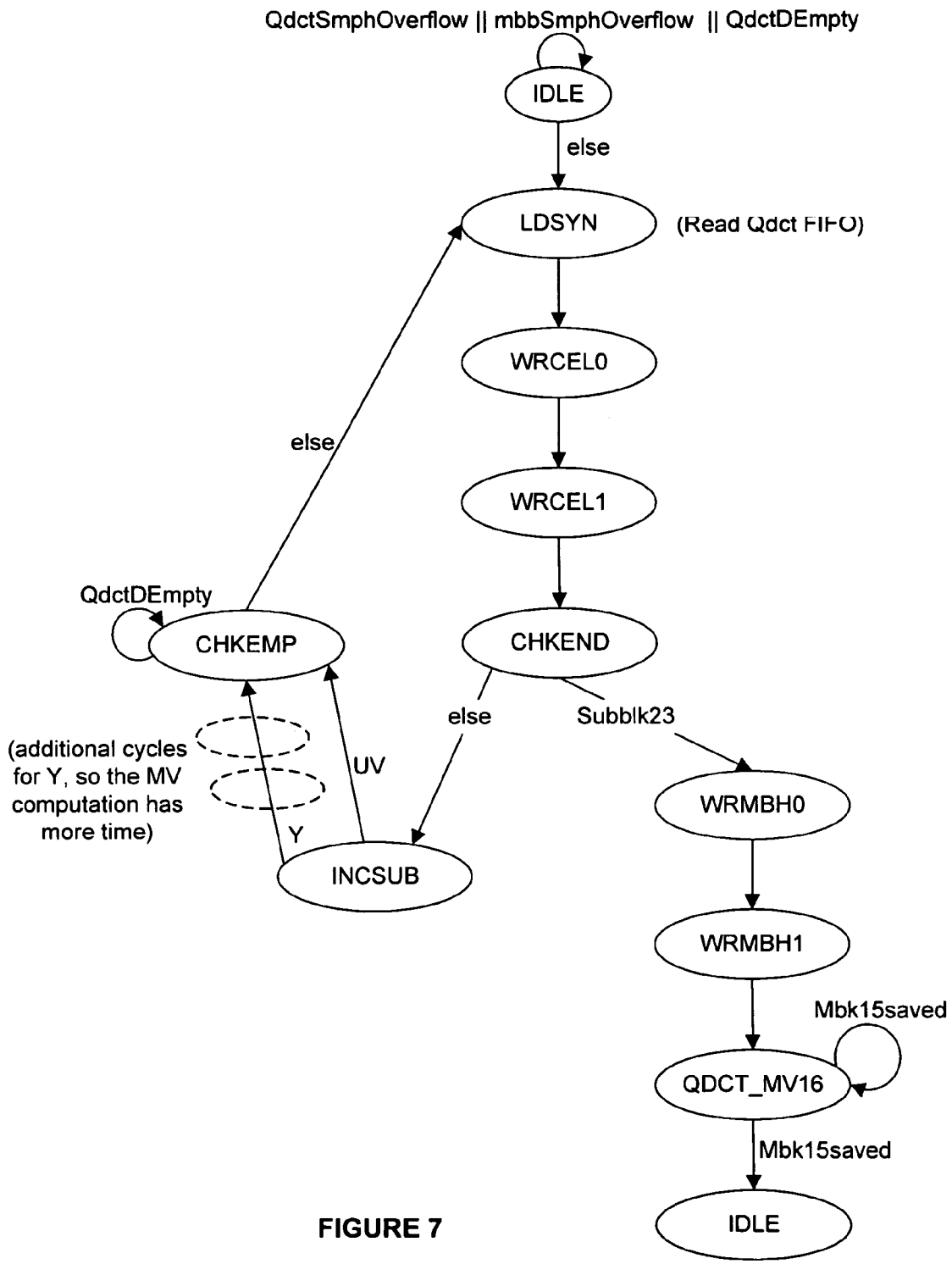
FIG. 7 illustrates a state machine configured to carryout transform, coefficient merging and motion vector prediction in accordance with one embodiment of the present invention.

The fourth stage (S4) is the main stage that controls all the 4×4 sub block count and matching the coefficient with the motion vector decoding that is performed on a 4×4 basis. The intra mode prediction is also calculated here and shares the same line buffer entry. For progressive frames, there are four entries of 80 bits for each of the macro block properties. For adaptive frames, there are eight entries of 80 bits for each macro block pair. A field/frame zigzag scan will be handled here also. All the results are written out to a memory (e.g., dual port SRAM shared by ILF/FIB data elements, DSP data elements, and Back P-vector data elements). This is controlled by the transform, coefficient merging and motion vector prediction state machine and the back. P-vector write state machine (FIG. 7).

The fifth stage (S5) mainly handles High Profile for CABAC and CALVC modes. A zigzag scan of 8×8 for both frame and field is executed here, with the results written out to a memory similar to the fourth stage S4 (e.g., dual port SRAM). Note that this stage is skipped in the Main Profile. This is controlled by the transform, coefficient merging and motion vector prediction state machine and the back P-vector write state machine (FIG. 7).

In each pipeline stage, note that there is one or more state machines associated with flow control. Each of the state machines will be discussed in reference to FIGS. 2A through 7.

In one particular embodiment, stage S1 of the pipeline is an input FIFO queue architecture that is configured for eight entries. Each entry has the associated macro block properties of length, zero residual, and total coefficients. Even though each FIFO entry has a maximum of sub-entries (e.g., seventeen), the length property indicates how many entries are valid.

The motion vector prediction may have a number of split modes. In one such embodiment, there are four split modes for the motion vector prediction: 16×16, 16×8, 8×16, and 8×8. Each split mode has its own motion vector computation logic, reference picture index computation, and frame field scaling. For the 8×8 split mode, there can also be four sub-split modes: 8×8, 8×4, 4×8, and 4×4. The B-type picture decoding has a dual channel read write structure, and the logic index ID searching is performed on a block by block basis. The block 1 logic index ID can be calculated while motion vector prediction is performed for block 0. Likewise, the block 2 logic index ID can be calculated while motion vector prediction is performed for block 1. Likewise, the block 3 logic index ID can be calculated while motion vector prediction is performed for block 2. Thus, block N+1 logic index ID can be calculated while motion vector prediction is performed for block N. This effectively hides or mitigates the searching time, and uses simple logic without the need for content addressable memory macros. In addition, for B-type picture decoding, the reference picture can be read from the dual read channel structure. If the current macro block is direct mode, then the reference picture can be used to decode the current macro block. If the current macro block in not direct mode, the reference picture is discarded. In this case, the B-type picture decoding will be similar to P-type picture decoding. If the current picture is a reference picture, then the macro block information can be written out to buffer (e.g., dual port SRAM) via the dual write channel structure.

In the example shown, the ISE syntax memory interfaces to the ISE memory control state machine (FIG. 2A) of stage S1 of the pipeline via a 24-bit bus. The ISE syntax memory indicates underflow when there is not enough data for one macro block decoding. There are several syntax groups of 24-bit data inside each macro block, and the ISE syntax memory provides the ISE memory control state machine of stage S1 with the length for every syntax group. Each of the 24 bits has an assigned meaning according to a known internal specification.

For example, the 24 bits collectively include the properties of the current macro block, such as: intra prediction, inter prediction, skip mode, raw data mode, macro block ID, slice ID, direct mode, macro block split mode, sub block split mode (which could be down to 4×4 for luma and 2×2 for chroma and all the corresponding intra prediction flag and motion vector differences on X and Y direction), picture reference index for forward and backward predictions, CABAC bit map and level, and CALVC run level information. The ISE memory control state machine of stage S1 collects all such information and groups it into 4×4 sub blocks for all predictions.

The ISE memory control state machine (FIG. 2A), residual decoder state machine (FIG. 2B), and the PCM raw data state machine (FIG. 4) can be used, for example, to control this interface between the ISE memory and stage S1 of the pipeline architecture.

The back P-vector input memory 1 (read channel 1) and the back P-vector input memory 2 (read channel 2) interface to stage S1 of the pipeline via a 128-bit bus in this example embodiment. There are underflow1 and undeflow2 indicators for each read channel memory. For frame pictures, channel 1 is for even macro block row reference read and channel 2 is for odd macro block reference read. For field pictures, channel 1 is for the top field picture and channel 2 is for the bottom field picture reference read. If the current decoding picture is a frame picture and the reference picture is field picture, either top field or bottom field, then both channels will have the same reference picture. This is a special case arrangement to facilitate the B-type picture decoding. For every macro block, there are five data beats of 128 bits that contain macro block properties, logical ID and physical ID of every 8×8 block inside the 16×16 macro block, and motion vectors of every 4×4 block.

In one embodiment, the back P-vector input memory 1 and back P-vector input memory 2 are implemented with a dual port SRAM. If the current decoding picture is B-type picture, then the reference picture can be read back, for example, from an off-chip double data rate-synchronous DRAM (DDR SDRAM) for direct mode motion vector prediction. Other memory devices can be used here as well, with factors such as power consumption and access speed determining the type of memory selected. The back P-vector read state machine (FIG. 3A) can be used, for example, to control the reference picture retrieving.

The line buffer is used mainly for motion vector prediction of inter prediction and intra prediction mode decoding, and in this example embodiment, interfaces to stages S4 of the pipeline via a 80-bit bus. In one particular embodiment, the line buffer holds one row of macro block properties for one line of pixels up to 1920 pixels for progressive frame, but holds two rows of macro block properties for two lines of pixels for adaptive frames. Such a configuration allows for high definition, but other configurations can be used here as well. (e.g., standard definition where each row is 720 pixels). Note that the line buffer can be implemented with conventional technology. In one embodiment, the line buffer is implemented with a single port SRAM that is shared by the Y, U, and V components of the video signal during the inter prediction and intra prediction decoding.

The fractional interpolation block and in-line loop filter (FIB/ILF) memory interfaces to stage S5 of the pipeline via a 128-bit bus. In one particular embodiment, for every macro block, there are 18 data beats of 128 bits that contain the macro block properties and expanded motion vector information of luma and chroma for forward and backward reference. For every 16×16 macro block, the DSP macro block header/data memory has forty-nine data beats of 128 bits. In particular, there is one data beat for the header and forty-eight data beats for the coefficients. Note that the DSP macro block header/data memory shares the 128-bit bus (along with the FIB/ILF and the back P-vector memories 1 and 2) to interface with stage S5 of the pipeline. The header includes information for the macro block properties.

Transform coefficients are stored in the macro block quantized DCT coefficient memory, which is also interfaced with stage S5 of the pipeline via a 128-bit bus in this embodiment. In particular, the coefficient memory saves all the data elements of 49 data beats of 128 bits (one beat for the macro block header and 48 beats for QDCT coefficients).

The back P-vector output memory 1 (write channel 1) and back P-vector output memory 2 (write channel 2) share the 128-bit bus along with the FIB/ILF and the DSP macro block header/data memory to interface with stage S5 of the pipeline. These two write channels can be configured the same as the back P-vector input memory 1 and back P-vector input memory 2 read channels. If the current decoding picture is a reference picture, then all the properties for each macro block can be saved, for example, to off-chip DDR SDRAM or other memory and read back into the chip (assuming a system-on-chip implementation) when the current decoding picture is a B-type picture. Unlike the read channels 1 and 2, as long as the current picture is marked as a reference picture (which could be I-type, P-type, or B-type picture), the picture can be saved to off-chip DDR SDRAM through these two write channels. Write channel 1 is for writing even row macro blocks of frame pictures and the top fields of field pictures, while write channel 2 is for writing odd row macro blocks of frame pictures and bottom fields of field pictures.

In one particular embodiment, each of the FIB/ILF memory, DSP macro block header/data memory, back P-vector output memory 1, back P-vector output memory 2 are implemented as one of four sections of a dual port SRAM. Such a configuration enables conservation of physical space and power consumption. Further note that the dual channels for read and write simplify architecture for direct mode motion vector prediction of B-type pictures. The macro block quantized discrete cosine transform (QDCT) coefficient memory can also be implemented using a dual port SRAM.

The state machine configured to carryout separation of coefficients and run level pairs (FIG. 5), the state machine configured to carryout run level pair decoding (FIG. 6), and state machine configured to carryout transform, coefficient merging and motion vector prediction (FIG. 7) can be used, for example, to control the interface between the output stage of the pipeline architecture (S4 or S5, depending on whether in the Main Profile or the High Profile) and the output memory (FIB/ILF memory, DSP macro block header/data memory, back P-vector output memory 1, back P-vector output memory 2, and macro block quantized discrete cosine transform (QDCT) coefficient memory).

Motion Vector Prediction/Intra Mode Prediction Scheme

Figure 1B:
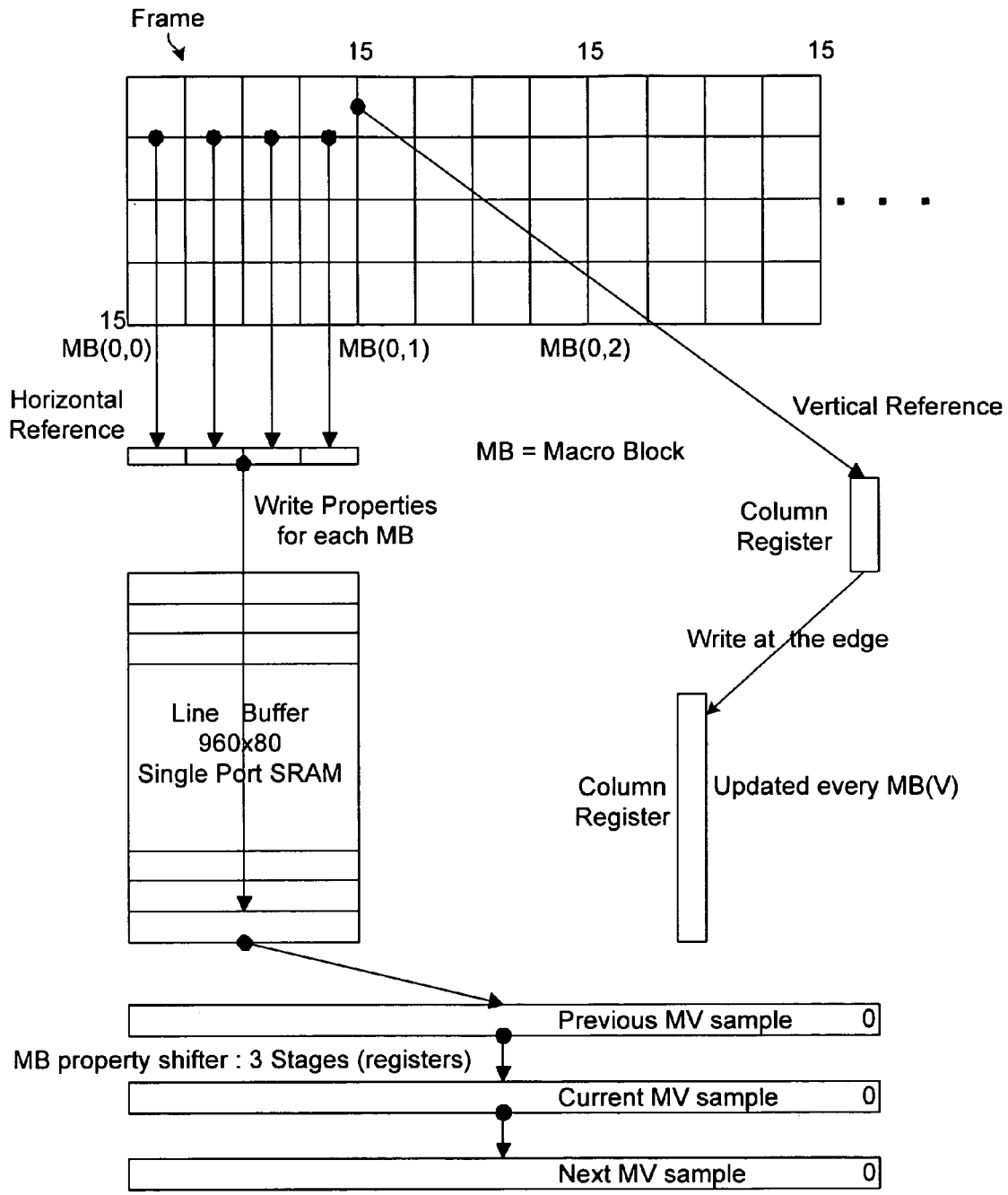
FIG. 1B illustrates a motion vector prediction scheme configured in accordance with one embodiment of the present invention.

FIG. 1B illustrates a motion vector prediction and intra mode prediction scheme configured in accordance with one embodiment of the present invention. This scheme carries out the interface between stage S4 (and S5 if High Profile) and the line buffer of FIG. 1A. Note that stage S1 has already grouped the macro block properties of the picture into 4×4 sub blocks.

As can seen, a portion of a frame is shown. The frame is divided into 4×4 sub block (16 pixels). These sub blocks are grouped together to form 8×8 blocks (64 pixels). These blocks are grouped together to form 16×16 macro blocks (256 pixels). As previously stated, the macro block properties are stored in the line buffer interface with stage S4 via the 80-bit bus. Each entry is associated with a horizontal reference and a vertical reference.

In this example, the horizontal reference is one row of sixteen pixels (where each of the four downward pointing arrows shown in FIG. 1B represent four pixels from the current row). Each row is stored in the line buffer, which in this case is a 960×80 single port SRAM. The vertical reference is provided by the four columns corresponding to the horizontal reference row. These macro block properties are stored in a vertical register (where the right and downward pointing arrow represents four pixels from one of the four current columns). This vertical register is updated for every 4×4 sub block for motion vector prediction for Main Profile and High Profile. For intra mode prediction, the register is updated for every 4×4 sub block for Main Profile, and for every 8×8 block for High Profile. This register is written out to another larger vertical register the collects and holds all properties for each macro block. This larger vertical register is updated for every macro block.

A macro block property shifter receives macro block property data from the line buffer, and is configured with three shift registers in this embodiment: a previous motion vector sample register, a current motion vector sample register, and a next motion vector sample register. Note that, while the motion vector macro block properties are being processed in these embodiments, the pixels associated with those motion vectors can also be processed with a similar structure, as discussed in the previously incorporated U.S. Ser. No. 11/137,971, filed May 25, 2005, titled "Digital Signal Processing Structure for Decoding Multiple Video Standards", published as U.S. Patent Application Publication 2006/0126740A1 on Jun. 15, 2006.

The macro block property format stored in the macro block property shifter can be as follows: REF0, REF1, Frame/Field picture, Slice, Intra/Inter prediction, Forward/Backward prediction, MV0, MV1. Here, MV is motion vector, REF is reference picture ID, 0 (zero) is for forward and 1 (one) is for backward. Thus, MV0 is the forward motion vector, MV1 is the backward motion vector, REF0 is the forward reference picture ID, and REF1 is the backward reference picture ID. Numerous register formats can be used here, and the present invention is not intended to be limited to any one such format. Further detail of this shifter structure is discussed in the previously incorporated U.S. Ser. No. 11/137,971, filed May 25, 2005, titled "Digital Signal Processing Structure for Decoding Multiple Video Standards", published as U.S. Patent Application Publication 2006/0126740A1 on Jun. 15, 2006.

In addition, although a 4×4 inter prediction mode scheme is shown in FIG. 1B, an 8×8 inter prediction mode scheme and/or a 16×16 inter prediction mode scheme can also be implemented similarly here, as discussed in the previously incorporated U.S. Ser. No. 11/137,971, filed May 25, 2005, titled "Digital Signal Processing Structure for Decoding Multiple Video Standards", published as U.S. Patent Application Publication 2006/0126740A1 on Jun. 15, 2006. This structure can also be extended to perform inter prediction of adaptive frame mode with double resources for 4×4, 8×8, and 16×16 macro block structures. In addition, the 4×4, 8×8, and 16×16 macro block structures are discussed separately, but the shared pipeline structure can process macro block structures in random order (e.g., 4×4, then 16×16, then 4×4, then 8×8, etc).

ISE Memory Control State Machine

Figure 2A:
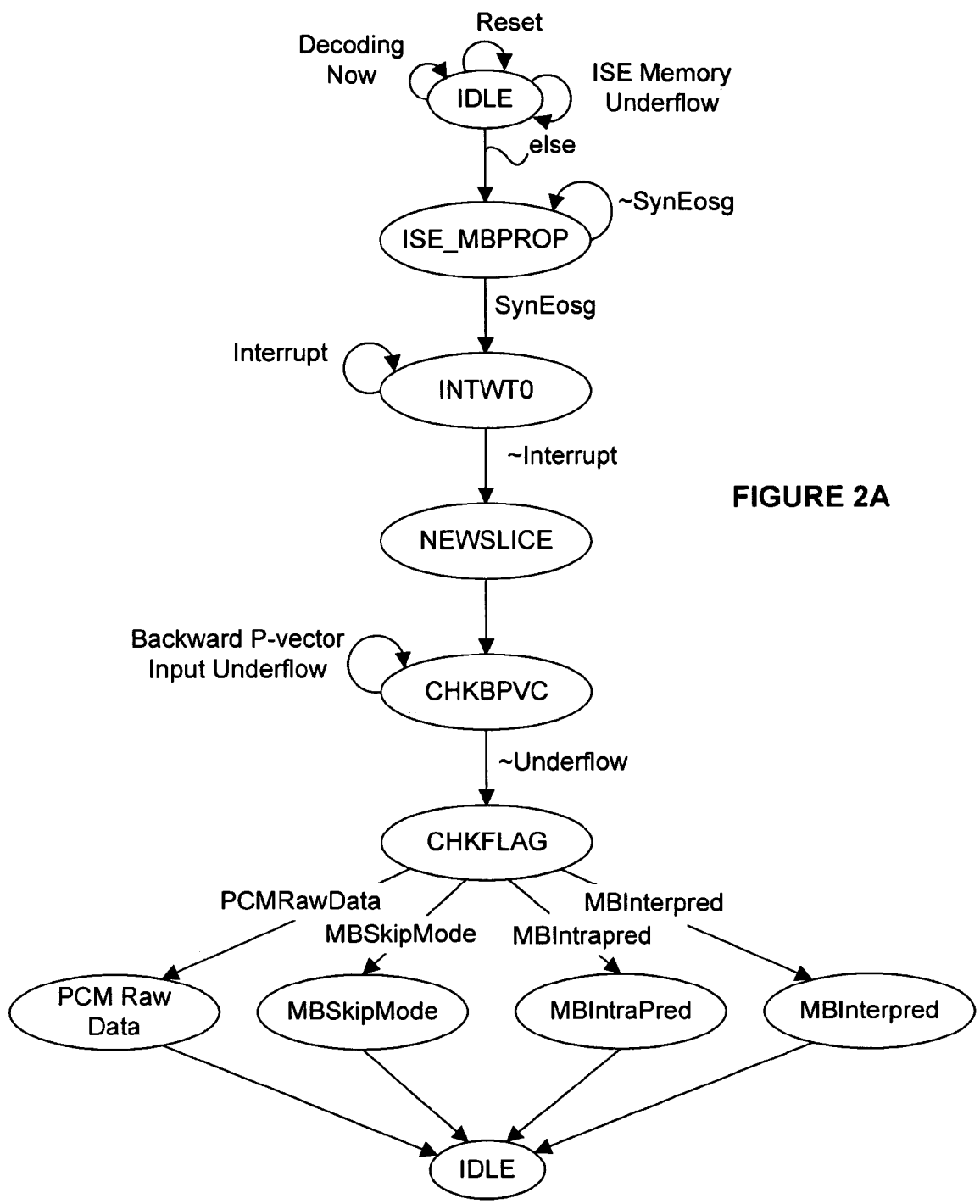
FIG. 2A illustrates an ISE memory control state machine configured in accordance with one embodiment of the present invention.

FIG. 2A illustrates an ISE memory control state machine configured in accordance with one embodiment of the present invention. The state machine remains in IDLE state during ISE memory underflow conditions, or in response to a reset, or during a decoding session. Otherwise, the next state is ISE_MBPROP. Here, the first syntax group is read. As previously explained, this syntax group has all the properties of the current macro block. This state continues until all bits of the syntax group string are read, as indicated by SynEosg (note that ~SynEosg indicates more bits to read, while SynEosg indicates there are no more bits to read for the current syntax group).

The INTWT0 state provides a wait for the interrupt to finish. Once the interrupt is finished (as indicated by ~Interrupt), the next state is NEWSLICE. This starts the decoding for a new slice. The next state CHKBPVC checks the back P-vector input memory 1 (read channel 1) and the back P-vector input memory 2 (read channel 2) for under flow condition. If there is under flow and the current decoding picture is a B-type picture, then wait.

Figure 2B:
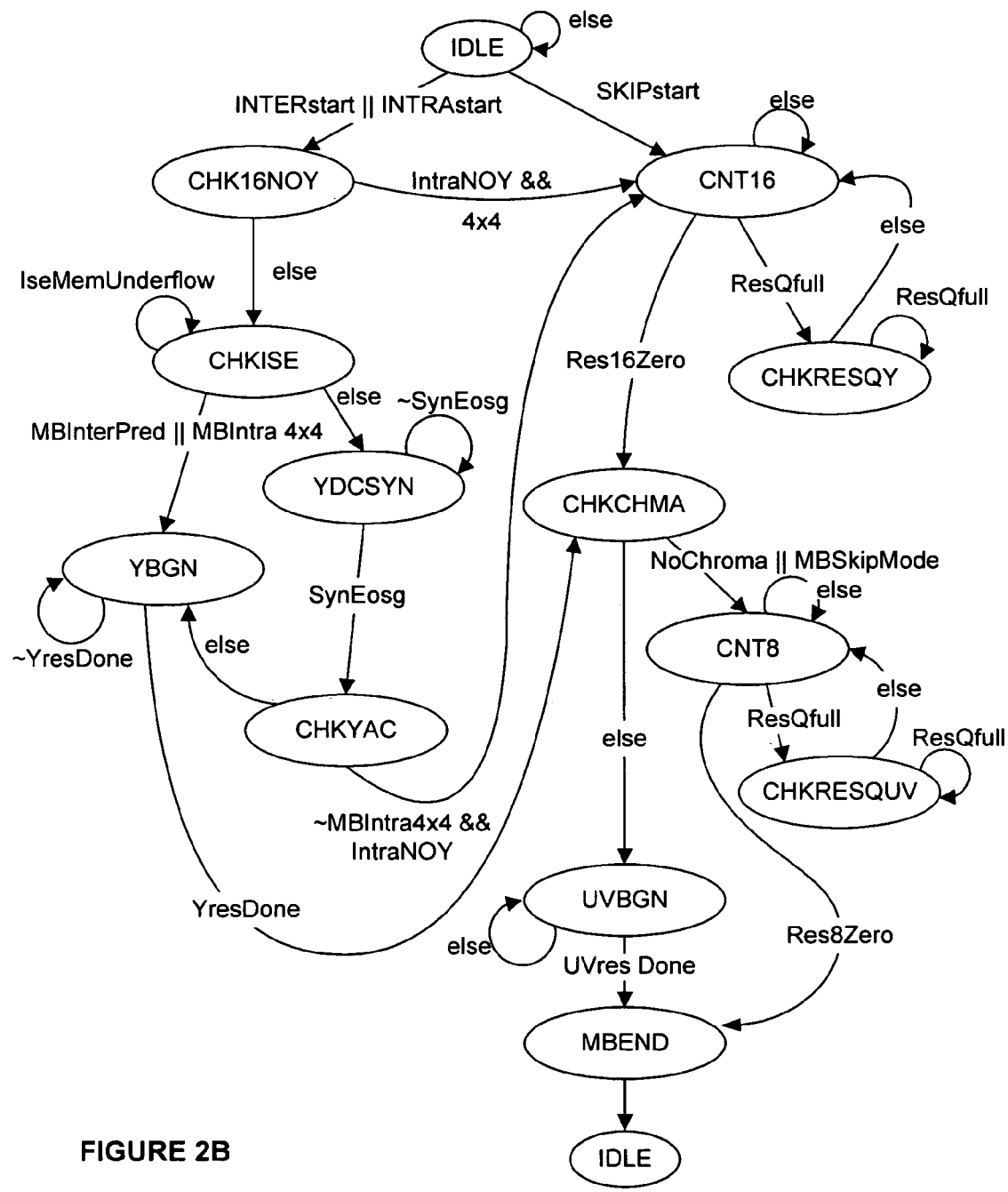
FIG. 2B illustrates a residual decoder state machine configured in accordance with one embodiment of the present invention.

If there is not underflow (as indicated by ~underflow), then start the macro block property checking. The CHKFLAG state checks the macro block properties for inter prediction, intra prediction, skip mode, and pulse coded modulation (PCM) raw data mode. The PCMrawData state starts PCM raw data state machine (FIG. 4). The MBSkipMode state starts the skip mode processing, and uses the residual decoder state machine (FIG. 2B). The MBIntraPred state starts the macro block intra prediction process and shares the residual decoder state machine (FIG. 2B). The MBInterPred state starts the macro block inter prediction process and also shares the residual decoder state machine (FIG. 2B).

The ISE memory control state machine generally operates as the main state machine that kicks off other state machines of the pipeline structure, as will be apparent in light of this disclosure. When the current stream is an H.264 stream and all the state machines are in IDLE state (e.g., when there is no H.264 data to process), a power saving mode can be implemented. In such a mode, non-active decoding logic can be shut down. Likewise, if the current stream is not an H.264 stream, then the whole pipeline architecture can be shut down. Various power consumption saving schemes can be used here.

Residual Decoder State Machine

FIG. 2B illustrates a residual decoder state machine configured in accordance with one embodiment of the present invention. Here, the machine remains in IDLE state if there are no intra and inter prediction starts (as indicated by INTERstart || INTRAstart), and no skip start (as indicated by SKIPstart).

For the skip start mode, go to state CNT16. For intra and inter prediction, start with the CHK16NOY state. Here, check for intra no luma (Y) case. If intra no luma, then go to state CNT16, where since there is no luma, there are total sixteen 4×4 sub blocks of zero. Else, go to the CHKISE state and start normal decoding.

From state CNT16, the CHKRESQY state checks to see if the input FIFO queue of stage S1 is full (as indicated by ResQfull). If the FIFO is full, then wait for the FIFO to be read. If the FIFO is not full, go back to state CNT16 and wait for the Res16zero signal, and then proceed to state CHKCHMA.

The CHKISE state determines if there is an ISE memory underflow (as indicated by IseMemUnderflow), and the process waits here until the ISE MEMORY has enough macro block data. If not intra 16×16 mode (as indicated by MBInterPred || MBIntra 4×4), then the CHKISE state proceeds to the YBGN state to start normal AC coefficient decoding for luma until done, as indicated by YresDone (note that ~YresDone indicates luma decoding is not done, while YresDone indicated luma coding is done). Otherwise, go to the YDCSYN state, which is the luma DC coefficient decoding state if intra 16×16 mode. The CHKYAC state checks for luma AC coefficient once the data is received (as indicated by SynEosg). From the CHKYAC state, if there is no luma AC coefficient (as indicated by ~MBIntra4×4 & IntraNOY), then go to the CNT16 state. Else if there is luma AC coefficient, go to the YBGN state, and start normal AC coefficient decoding for luma until done.

When the AC coefficient decoding for luma is done, the CHKCHMA state checks for chroma. If there is no chroma (as indicated by NoChroma || MBSkipMode), then go to the CNT 8 state to output eight 4×4 sub blocks of zero. Otherwise, go to UVBGN and start chroma decoding. From state CNT8, the CHKRESQUV state checks to see if the input FIFO queue of stage S1 is full (as indicated by ResQfull). If the FIFO is full, then wait for the FIFO to be read. If the FIFO is not full, go back to state CNT8 and wait for the Res8 zero signal, and then proceed to state MBEND.

The WVBGN state starts Chroma decoding until all chroma decoding is done (as indicated by UVresDone). The MBEND state issues a macro block end signal, and returns to the IDLE state so that a new macro block can be processed.

Back P-Vector Read/Write State Machines

Figure 3A:
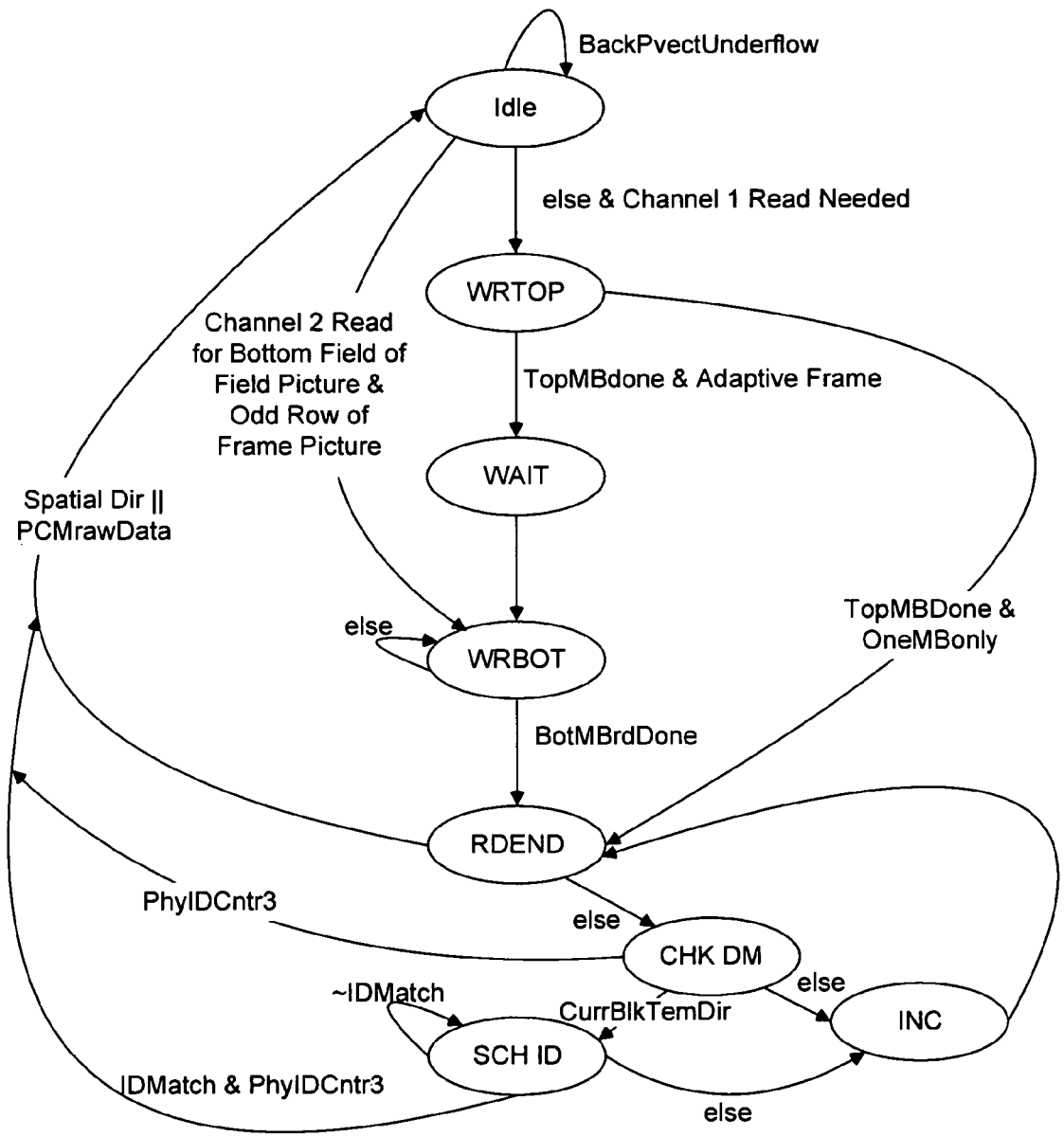
FIG. 3A illustrates a back P-vector read state machine configured in accordance with one embodiment of the present invention.
Figure 4:
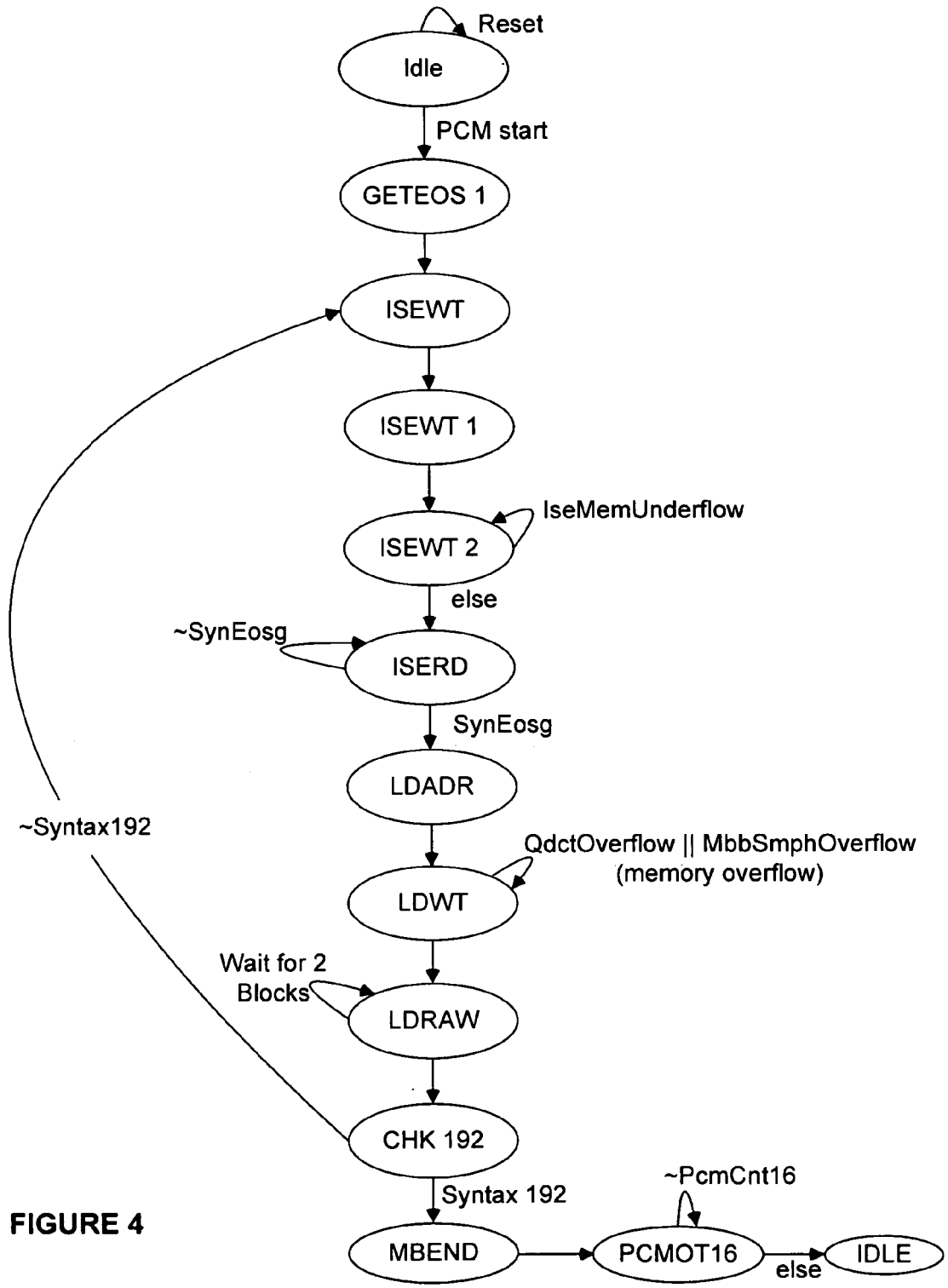
FIG. 4 illustrates a PCM raw data state machine configured in accordance with one embodiment of the present invention.

FIG. 3A illustrates a back P-vector read state machine configured in accordance with one embodiment of the present invention. The machine remains in IDLE state as long as there is a back P-vector input memory underflow (as indicated by BackPvectUnderflow).

The WRTOP state reads the reference data from channel 1. This is mainly for even macro block row or top field reads. The WAIT state provides delay between the channel 1 and channel 2 reads. In addition, the WRTOP state indicates that the top macro block read is done and only one macro block was read. In this case, go to the RDEND state to start searching logic ID (as indicated by TopMBDone & OneMBonly).

The WRBOT state reads the reference data from channel 2. This is mainly for odd macro block row or bottom field reads. Then bottom macro block read is indicated by BotMBrdDone. Otherwise, the process waits at the WRBOT state.

The RDEND state receives indications from the WRTOP and WRBOT states that the respective reads are done, and is the macro block read end. If in spatial direct mode or the current macro block is a PCM raw data macro block (as indicated by Spatial Dir || PCMrawData), then go back to the IDLE state. No logic ID searching is performed here.

Else, the CHKDM state checks for the temporal direct mode. If the current block is temporal direct mode (as indicated by CurrBlkTemDir), then the SCHID state starts searching logic ID until all four logic ID for all 4 blocks are found. The search is carried out on a block by block basis. If the current block is not temporal direct mode, then go to the INC state and skip to the next block. The INC state increments to next block.

The SCHID state searches the ID state until a match is found (as indicated by IDMatch). Note that it may take 1 to 32 cycles to find one logic ID match. Upon finding all the logic ID (as indicated by the IDMatch & PhyIDCntr3 ), the flow returns to the IDLE state to wait for new task.

Figure 3B:
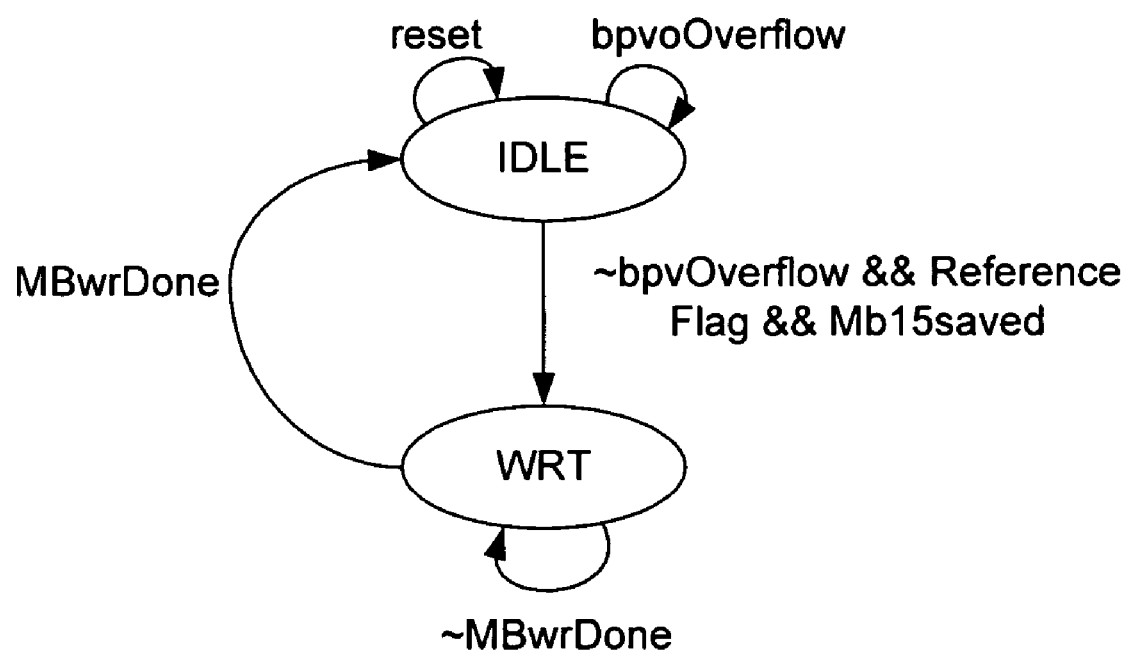
FIG. 3B illustrates a back P-vector write state machine configured in accordance with one embodiment of the present invention.

FIG. 3B illustrates a back P-vector write state machine configured in accordance with one embodiment of the present invention. As can be seen, the write state machine is relatively simple compared to the read state machine. If the back P-vector write channels 1 and 2 are not overflowed (as indicated by bpvoOverflow) and the current macro block properties to the FIB/ILF module have been saved and the current picture is a reference picture, then go to the WRT state. Otherwise, stay at the IDLE state. At the WRT state, the P-vector write is continued until MBDone is asserted. Then, go to IDLE.

PCM Raw Data State Machine

FIG. 4 illustrates a PCM raw data state machine configured in accordance with one embodiment of the present invention. The state machine remains in IDLE state during non PCM raw data modes, or in response to a reset. Otherwise, the next state is GETEOS1, which gets the first syntax group.

The ISEWT-ISEWT2 states wait to check the ISE memory underflow condition (as indicated by IseMemUnderFlow). When there is no ISE memory underflow condition, the ISERD state reads data from the ISE memory until the end of the current syntax group (as indicated by SynEosg). The LDADR state and the LDWT state both enable the macro block header write during the PCM raw data mode. The LDWT state checks for an overflow condition of output memory (as indicated by QdctOverflow || MbbSmphOverflow).

The LDRAW state loads raw data for two blocks, and the flow continues to the CHK192 state. In this particular embodiment, the raw scan mode is not 4×4 sub block format. It is raster scan and sixteen pixels per line, with two blocks being a 64 count and six blocks being 192 counts. Thus, the flow from the ISEWT state to the CHK192 state is repeated until 192 counts is reached (as indicated by Syntax192).

After 192 counts is reached, then start the next macro block. The MBEND state issues the end of macro block in response to the Syntax192 condition being satisfied, and the PCMCNT16 state counts sixteen sub blocks (as indicated by PcmCnt16), and then ends with the IDLE state.

Separation of Coefficients and Run Level Pair State Machine

FIG. 5 illustrates a syntax group math state machine configured to carryout separation of coefficients and run level pairs in accordance with one embodiment of the present invention. Here, the machine remains in IDLE state if the input FIFO queue of stage S1 is empty (as indicated by ResQempty).

The LDSYN state loads the syntax group if the input FIFO queue is not empty. The CHK0 SUB state checks the current 4×4 sub block for zero sub block. If the current sub block is all zero, all coefficient (no zero) as indicated by CurSubZero || ZeroCoeff || AllCoeff, then go to the CHKFULL state. Else, the MATHOP state does level load to the registers until there are no more entries in the current sub block, as indicated by MathOPDone0. The MathOPDone0 signal is controlled by the number of nonzero level coefficients (note that ~MathOPDone0 indicates that there are more entries in the current sub block).

When there are no more entries in the current sub block, the CHKFULL state checks the next stage FIFO for full condition. If it is full (as indicated by Runb4Full), wait here until it is not full. If the next stage FIFO is not full, then the LDPROP state writes to next stage FIFO.

Run Level Pair Decoding State Machine

Figure 6:
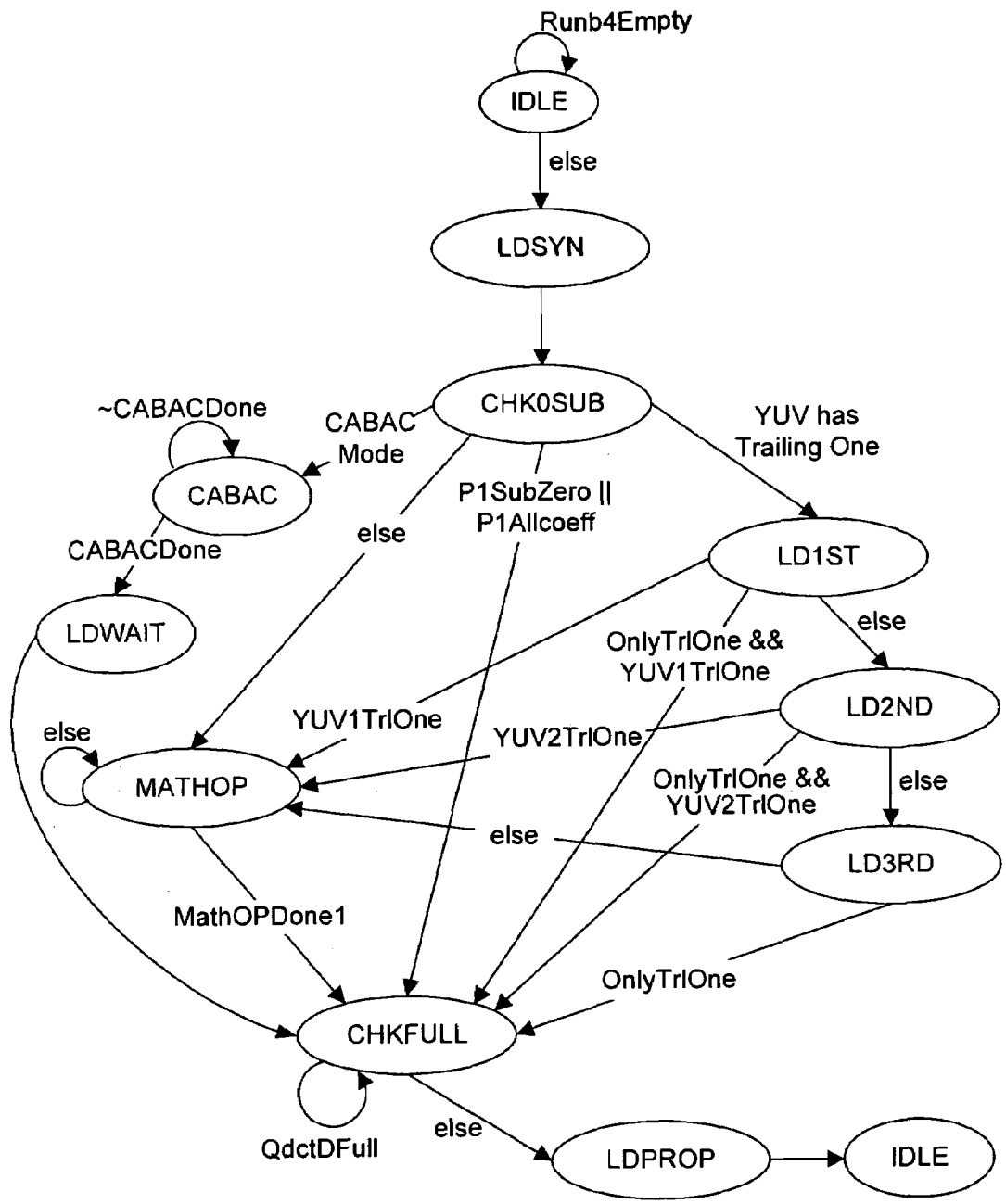
FIG. 6 illustrates a syntax group math state machine configured to carryout run level pair decoding in accordance with one embodiment of the present invention.

FIG. 6 illustrates a syntax group math state machine configured to carryout run level pair decoding in accordance with one embodiment of the present invention. The machine remains in IDLE state if the previous stage FIFO is empty (as indicated by Runb4empty). Else, the LDSYN state loads the current register set with the previous stage FIFO if it is not empty.

The CHK0SUB state determines if the loaded data is zero sub block (as indicated by P1SubZero || P1AllCoeff). If so, then go to CHKFULL to determine if the QDCT data FIFO is full. Else, if there is a trailing one, then go to the LD1ST state to start the trailing one decoding. Else, if CABAC mode, then go to the CABAC state. Otherwise, go to the MATHOP state for normal run level decoding.

The LD1ST state searches for the first trailing one and checks for a second trailing one. If there is a second trailing one, then go to the LD2ND state. Else, if only one trailing one exists (as indicated by OnlyTrlOne && YUV1TrlOne), then go to the CHKFULL state to check to see if the QDCT data FIFO is full. Else, go to the MATHOP state for normal decoding flow (as indicated by YUV1TrlOne).

The LD2ND state searches for the second trailing one and checks for a third trailing one. If there is a third trailing one, then go to the LD3RD state. Else, if only two trailing ones exist (as indicated by OnlyTrlOne && YUV2TrlOne), then go to the CHKFULL state to check to see if the QDCT data FIFO is full. Else, go to the MATHOP state for normal decoding flow (as indicated by YUV2TrlOne).

The LD3rd state searches for the third trailing one. If only trailing one exists (as indicated by OnlyTrlOne), then go to the CHKFULL state to check to see if the QDCT data FIFO is full. Else, go to the MATHOP state for normal decoding flow.

The MATHOP state carries out normal run level decoding flow. The CHKFULL state determines whether the QDCT data FIFO is full. If it is not full (as indicated by QdctDFull), then go to the LDPROP state, which will write the current sub block into the QDCT data FIFO. Else, wait at the CHKFULL state until the QDCT data FIFO is not full.

The CABAC state carries out CABAC decoding, and continues until that decoding is done, as indicated by CABACDone (where ~CABACDone indicates that the CABAC decoding is not done, and CABACDone indicates that the CABAC decoding is done). When CABAC decoding is done, the go to LDWAIT state, and then continue to the CHKFULL state.

Transform, Coefficient Merging, and Motion Vector Prediction State Machine

FIG. 7 illustrates a state machine configured to carryout transform, coefficient merging and motion vector prediction in accordance with one embodiment of the present invention. The machine remains in IDLE state as long as the output memory is full or overflowed or the QDCT data FIFO is empty (as indicated by QdctSmphOverflow∥mbbSmphOverflow∥QdctDEmpty). Else, the LDSYN state loads the current sub block QDCT data into the output memory. Note that this involves reading the QDCT data FIFO. During the same period that the current sub block is decoded, the motion vector prediction for the corresponding 4×4 sub block is computed.

The WRCEL0 state writes the first half of current sub block, and the WRCEL1 state writes the 2nd half of current sub block. The CHKEND state checks for the end of the current macro block. If not the end of macro block (as indicated by Subblk23), then the INCSUB state continues the operation until the end of macro block (24 sub blocks) is reached.

The CHKEMP state determines if the QDCT data FIFO is empty. If it is empty (as indicated by QdctDEmpty), then wait at the CHKEMP state. Else, go to the LDSYN state and start the next sub block. Note that additional cycles can be added between the INCSUB state and the CHKEMP state for Y processing (as compared to UV processing), so the motion vector computation has more time.

The WRMBH0 state writes the first macro block header to the in-line loop filter (ILF) and fractional interpolation block (FIB). The WRMBH1 state writes the second macro block header to the ILF and FIB. These are the first two entries of the data element to other blocks (FIB and ILF). The remaining 16 data beats are for motion vector writes, which are executed in next state: QDCT_MV16. The QDCT_MV16 state writes all the motion vectors to output memory. When the motion vector writes are complete (as indicated by Mbk15saved). Note that there are total of eighteen data beats for luma and chroma for this embodiment.

The foregoing description of the embodiments of the invention has been presented for the purposes of illustration and description. It is not intended to be exhaustive or to limit the invention to the precise form disclosed. Many modifications and variations are possible in light of this disclosure. For instance, the bus sizes (e.g., 128-bit, 24-bit, and 80-bit) between the memories and the macro block builder can be varied, depending on the particular application at hand. It is intended that the scope of the invention be limited not by this detailed description, but rather by the claims appended hereto.

What is claimed is:

1. A video decoding system configured with a multi-stage shared pipeline architecture for carrying out the H.264 CABAC and CALVC entropy decoding processes in Main Profile and High Profile, comprising:
   a first stage for grouping macro block properties into 4×4 sub blocks;
   a second stage for performing separation of coefficients and run level pairs;
   a third stage for performing run level pair decoding;
   a fourth stage for performing 4×4 block zigzag transform, DC/AC coefficient merging, and motion vector prediction;
   a fifth stage for performing 8×8 transforms in the High Profile, and is skipped in the Main Profile;
   a fractional interpolation block and in-line loop filter (FIB/ILF) memory interfaced to the fifth stage via a 128-bit bus, wherein for every macro block, there are 18 data beats of 128 bits that contain macro block properties and expanded motion vector information of luma and chroma for forward and backward reference;
   a DSP macro block header/data memory interfaced to the fifth stage via the 128-bit bus, wherein for every 16×16 macro block, the DSP macro block header/data memory has 1 data beat of 128 bits for a header that includes information for macro block properties and 48 data beats of 128 bits for coefficients; and
   a dual channel write memory interfaced to the fifth stage via the 128-bit bus, wherein write channel 1 of the memory is for writing even row macro blocks of frame pictures and top fields of field pictures, while write channel 2 of the memory is for writing odd row macro blocks of frame pictures and bottom fields of field pictures.

2. The system of claim 1 wherein each of the FIB/JLF memory, the DSP macro block header/data memory, and the dual channel write memory are implemented using a dual port SRAM.

3. A video decoding system configured with a multistage shared pipeline architecture for carrying out the H.264 CABAC and CALVC entropy decoding processes in Main Profile and High Profile, comprising:
   a first stage configured for grouping macro block properties into 4×4 sub blocks;
   a second stage for performing separation of coefficients and run level pairs;
   a third stage for performing run level pair decoding;
   a fourth stage for performing 4×4 block zigzag transform, DC/AC coefficient merging, and motion vector prediction;
   a fifth stage for performing 8×8 transforms in the High Profile, and is skipped in the Main Profile;
   a memory interfaced to the first stage via a 24-bit bus, wherein there are a plurality of syntax groups of 24-bit data inside each macro block, and the memory provides the first stage with the length for every syntax group;
   dual read channels and dual write channels for direct mode motion vector prediction of B-type pictures;
   a fractional interpolation block and in-line loop filter (FIB/ILF) memory interfaced to the fifth stage via a first 128-bit bus, wherein for every macro block, there are 18 data beats of 128 bits that contain macro block properties and expanded motion vector information of luma and chroma for forward and backward reference;
   a DSP macro block header/data memory interfaced to the fifth stage via the first 128-bit bus, wherein for every 16×16 macro block, the DSP macro block header/data memory has 1 data beat of 128 bits for a header that includes information for macro block properties and 48 data beats of 128 bits for coefficients; and
   a macro block quantized DCT coefficient memory interfaced to the fifth stage via a second 128-bit bus, for storing dequantized DC/AC coefficients.

4. A video decoding system configured with a multistage shared pipeline architecture for carrying out the H.264 CABAC and CALVC entropy decoding processes in Main Profile and High Profile, comprising:
   a first stage including a memory control state machine that collects information about macro block properties and groups it into 4×4 blocks for all predictions;
   a second stage for performing separation of coefficients and run level pairs;
   a third stage for performing run level pair decoding;
   a fourth stage for performing 4×4 block zigzag transform, DC/AC coefficient merging, and motion vector prediction, wherein the fourth stage has four split modes for the motion vector prediction: 16×16, 16×8, 8×16, and 8×8, and each split mode has its own motion vector computation logic, reference picture index computation, and frame field scaling;

a fifth stage for performing 8×8 transforms in the High Profile, and is skipped in the Main Profile;

dual read channels and dual write channels for direct mode motion vector prediction of B-type pictures;

a memory interfaced to the first stage via a 24-bit bus, wherein there are a plurality of syntax groups of 24-bit data inside each macro block, and the memory provides the first stage with the length for every syntax group;

a fractional interpolation block and in-line loop filter (FIB/ILF) memory interfaced to the fifth stage via a first 128-bit bus, wherein for every macro block, there are 18 data beats of 128 bits that contain macro block properties and expanded motion vector information of luma and chroma for forward and backward reference;

a DSP macro block header/data memory interfaced to the fifth stage via the first 128-bit bus, wherein for every 16×16 macro block, the DSP macro block header/data memory has 1 data beat of 128 bits for a header that includes information for macro block properties and 48 data beats of 128 bits for coefficients; and a macro block quantized DCT coefficient memory interfaced to the fifth stage via a second 128-bit bus, for storing dequantized DC/AC coefficients.

* * * * *